Jan. 31, 1967  G. A. EXLEY ET AL  3,301,927
METHOD OF MOLDING A HIGH STRENGTH, LOW DENSITY STRUCTURE
Filed Aug. 7, 1964
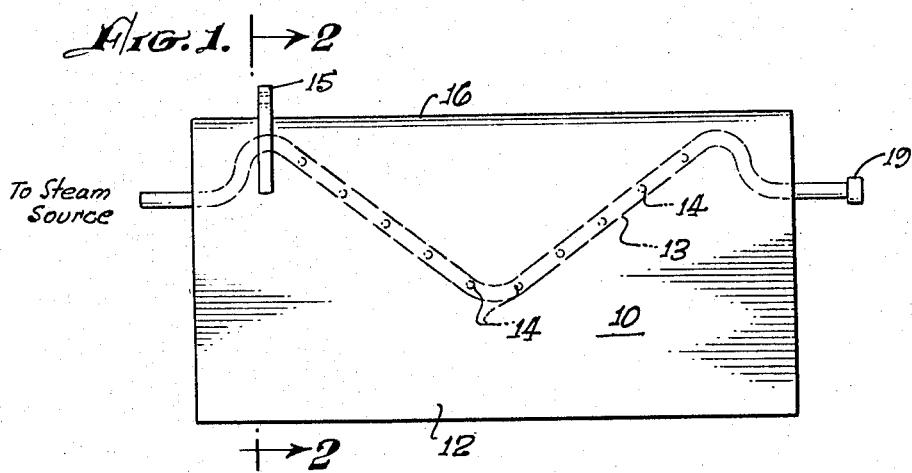
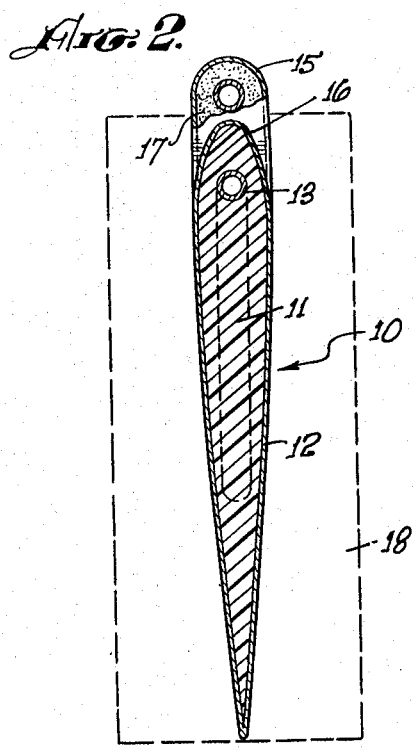
INVENTORS.
GEORGE A. EXLEY,
LOUIS F. SCHERER,
By
ATTORNEY.

3,301,927
METHOD OF MOLDING A HIGH STRENGTH, LOW DENSITY STRUCTURE
George A. Exley, Alta Loma, and Louis F. Scherer, Pomona, Calif., assignors to General Dynamics Corporation, Pomona, Calif., a corporation of Delaware
Filed Aug. 7, 1964, Ser. No. 388,117
5 Claims. (Cl. 264—45)

This invention relates to the manufacture of structures, devices, or parts which incorporate cellular materials as structural layers or cores, and relates more particularly to the manufacture of structures such as control surfaces.

Heretofore many structures have been built which have sought a maximum condition of rigidity coupled with minimum density. In an effort to attain optimum conditions of strength and weight, various means have been used to create a structure with foamed interior composed of resinous materials. These structures have been widely used in the production of component parts, for example, in the manufacture of aircraft and guided missiles.

Cellular plastics, such as foamed alkyd resin-polyisocyanate plastics, foamed phenolic plastics, etc., are now employed as internal materials or fillers, as layers or laminations in sandwich type assemblies, and in like situations. These foamed or cellular materials have numerous applications and will undoubtedly go into more extensive use as they may be easily poured in place or otherwise applied as a liquid or semi-liquid and then allowed to react or foam up to form a relatively strong, rigid light weight mass or body adhering to the adjacent surfaces.

One of the problems in air vehicles, especially light weight air vehicles, is the provision of light weight control systems and surfaces thereof which provide the highest ratio of control force to weight for controlling the direction and stability of the vehicle.

Since cellular material such as polystyrene beads can be cured to variable densities, a minimum required load can be calculated for a product such as a control vane or surface by varying the density to meet these loads, thus providing a light weight, low dynamic pressure control surface.

Therefore, it is an object of this invention to manufacture low density structures.

A further object of the invention is to provide a unique method of displacing polystyrene beads in order to assure equal weight distribution.

Another object of the invention is to provide a method of utilizing the application of steam for expanding polystyrene beads which produces source heat for curing and increases the quantity of parts that can be produced from a mold in a specified time.

Another object of the invention is to manufacture a structure utilizing polystyrene wherein the structural support member of the structure acts as a steam injector for expanding and curing the polystyrene.

Other objects of the invention not specifically set forth above will become readily apparent from the following description and drawings wherein:

FIG. 1 is a plan view of a control surface constructed in accordance with the invention; and FIG. 2 is a cross-sectional view taken on the line 2—2 of FIG. 1 and showing the mold therefor in phantom.

Briefly, this invention relates to the manufacture of a structure such as a control surface. More particularly, a layer of polystyrene beads is secured by a spray adhesive to the interior surface of a sheet of material, such as aluminum, that will ultimately be formed into the outer skin of the structure. Said structure is fitted with an appropriately located apertured aluminum tube that serves the functions of providing internal structural support, conveying steam to the polystyrene beads, and affording the control surface with mounting means. The assembly is then placed in a mold (that prescribes the desired structure shape) and is secured firmly against movement that might result as the polystyrene reacts to the heat of the steam introduced through said tube and expands, thereby occupying the entire interior of the structure. Also, a connection comprising an aluminum strip filled with high impact resin may be attached to the edge of said structure.

Referring now to the drawing, the structure of the invention is shown in the shape of a control surface 10 for an air vehicle or the like (not shown). Control surface 10 comprises a central light weight polystyrene core 11, a thin aluminum skin 12 on the outer surface of core 11, an aluminum tube 13 having apertures 14 therein and running through the central portion of core 11 for providing internal structural support and for attaching points to an associated vehicle, and an aluminum bracket 15 bonded onto the leading edge 16 of the skin 12 and filled with a resin 17 having high resistance to impact to provide a control attachment or the like. As shown in FIG. 1, tube 13 is configured to provide adequate internal support, provide sufficient heating area during construction thereof due to the distribution of apertures 14, and prevent rotation thereof with respect to the foamed polystyrene core 11.

The control surface 10 is constructed by applying a layer of expandable polystyrene beads on the inner surface of skin 12 and applying a liquid adhesive thereto to hold the polystyrene beads in place. The tube 13 is then placed on the portion of skin 12 which has the polystyrene beads applied at a desired location, and the assembly is then placed in a mold 18 which has an inside contour of the control surface configuration desired. Tube 13 is blocked off at one end as indicated at 19 and the other end of tube 13 is connected to a source of steam as indicated by legend. With the assembly secured in mold 18 steam is applied and flows through the series of apertures 14 thus creating heat for expanding the polystyrene beads to the configuration of the contour of the skin 12 as determined by mold 18. The bracket 15 can be mounted on skin 12 either prior to or after the expansion of the polystyrene beads or can be constructed integral with skin 12 as shown in FIG. 2.

It has thus been shown that this invention provides the following advantages: (1) a unique method of displacing polystyrene beads in order to assure equal weight distribution; (2) steam application for expanding polystyrene beads which produces source heat for curing and increases the quantity of parts that can be produced from one mold in a specified time; (3) utilizes the structural member of the product as a steam injector; (4) produces a proper strength to weight ratio; (5) has internal structural support for light weight products; and (6) can effectively replace light weight products that are too fragile.

As pointed out above, polystyrene beads can be cured to variable densities. Therefore, a minimum required load can be calculated for a product such as the above described control surface by varying the density to meet these loads while maintaining a very light weight product.

While the invention has been illustrated and described with respect to a control surface for an air vehicle, it is not intended to limit the invention to a specific application or to any specific type of part produced.

Although a particular embodiment has been illustrated and described for carrying out the invention, modifications thereof will be apparent to those skilled in the art, and it is intended to cover in the appended claims all such modifications as come within the spirit and scope of the invention.

What we claim is:

1. The method of producing a high strength, low density structure having an imperforate outer skin, a supporting core member and an intermediate portion of low density comprising the steps of adhering a quantity of beads of expandable low-density material sufficient on expansion to constitute the intermediate portion to a surface area of a sheet of material which will ultimately be the outer skin of the structure being formed; positioning a member having apertures transversely with respect to at least a portion of the surface area of the sheet of material which functions as an internal structural support, a heating conduit for the beads of expandable material, and as a support member for the final product; securing the assembly in a mold; and supplying steam to the member for expanding the low density material so as to conform the low density material and outer skin essentially with the contour of the mold and to form the intermediate portion.

2. The method defined in claim 1 additionally including the steps of bonding a bracket means to an external portion of said sheet of material, and filling the bracket means with a resin resistant to high impact.

3. The method of producing a high strength, low density structure having an imperforate outer skin, a supporting core and an intermediate portion of low density comprising the steps of adhesively adhering a quantity of expandable polystyrene beads sufficient on expansion to constitute the intermediate portion to at least a portion of a surface of a sheet of material which will ultimately be formed into the outer skin of the structure; placing a member having apertures therein transversely with respect to at least a portion of the surface of the material and extending outwardly therefrom, the member functioning as a heating conduit for the expandable beads, as an internal structural support, and as a support member for the final structure; securing the thus assembled structure in a mold, supplying steam to the member which flows through the apertures therein creating heat for expanding the polystyrene beads to conform with the contour of the mold and to form the intermediate portion, cutting off the supply of steam, and removing the formed structure from the mold.

4. The method defined in claim 3 additionally including the steps of bonding at least one bracket member onto the sheet of material, and filling the bracket member with a resin resistant to high impact.

5. The method of producing a high strength, low density structure having an imperforate outer skin, a supporting core and an intermediate portion of low density comprising the steps of adhering a quantity of expandable polystyrene beads sufficient on expansion to constitute the intermediate portion to a surface of a sheet of material which opposite surface will be the outer skin of the structure; positioning a member having apertures therein adjacent the polystyrene beads and transversely with respect to at least a portion of the sheet of material, the member functioning as a heating conduit for the expandable beads and at least as an internal structure support for the final structure, securing the thus assembled structure in a mold so that the sheet of material defines a cavity with the polystyrene beads and the member located therein, and supplying steam to the member which flows through the apertures therein creating heat for expanding the polystyrene beads to conform with the contour of the mold and to form the intermediate portion.

References Cited by the Examiner
UNITED STATES PATENTS

| | | | |
|---|---|---|---|
| 1,435,244 | 11/1922 | Kemp | 244—133 XR |
| 2,312,546 | 3/1943 | Hazard et al. | 244—90 |
| 2,693,922 | 11/1954 | Ellison et al. | 244—123 |
| 2,954,589 | 10/1960 | Brown | 264—51 |
| 2,977,639 | 4/1961 | Barkhuff et al. | 264—45 |
| 2,979,246 | 4/1961 | Liebeskind | 264—45 XR |
| 3,000,058 | 9/1961 | Thielen | 264—45 |
| 3,037,897 | 6/1962 | Pelley | 264—45 XR |
| 3,068,526 | 12/1962 | Croan | 264—51 |
| 3,079,645 | 3/1963 | Cosmos | 264—259 XR |
| 3,081,488 | 3/1963 | Casavina et al. | 264—50 XR |
| 3,124,626 | 3/1964 | Graham et al. | 264—45 |

FOREIGN PATENTS

| | | |
|---|---|---|
| 411,668 | 3/1925 | Germany. |
| 596,847 | 8/1959 | Italy. |

References Cited by the Applicant
UNITED STATES PATENTS

| | | |
|---|---|---|
| 2,331,047 | 10/1943 | Schairer. |
| 2,353,447 | 7/1944 | Doherty. |
| 2,428,970 | 10/1947 | Hardy. |
| 2,478,830 | 9/1949 | Lemonier et al. |
| 2,693,922 | 11/1954 | Ellison et al. |
| 2,706,311 | 4/1955 | Durst et al. |
| 2,728,702 | 12/1955 | Simon et al. |
| 2,877,503 | 3/1959 | Puderbaught et al. |
| 2,895,173 | 7/1959 | Atticks. |

OTHER REFERENCES

Modern Plastics Encyclopedia, issue of 1961, pp. 827–829.

ALEXANDER H. BRODMERKEL, *Primary Examiner.*

ROBERT F. WHITE *Examiner.*

P. E. ANDERSON, *Assistant Examiner.*